(12) United States Patent
Saeki et al.

(10) Patent No.: US 8,429,136 B2
(45) Date of Patent: Apr. 23, 2013

(54) INFORMATION PROCESSING METHOD AND INFORMATION PROCESSING APPARATUS

(75) Inventors: Toshiaki Saeki, Kawasaki (JP); Yuichi Tsuchimoto, Kawasaki (JP); Hiromichi Kobashi, Kawasaki (JP); Miho Murata, Kawasaki (JP); Nobutaka Imamura, Kawasaki (JP); Yasuo Yamane, Kawasaki (JP); Hiroki Moue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/117,895

(22) Filed: May 27, 2011

(65) Prior Publication Data

US 2012/0136837 A1      May 31, 2012

(30) Foreign Application Priority Data

May 28, 2010 (JP) ................. 2010-123138

(51) Int. Cl.
G06F 17/30 (2006.01)
(52) U.S. Cl.
USPC .......................................... 707/689; 707/686
(58) Field of Classification Search .................. 707/689, 707/686
See application file for complete search history.

(56) References Cited

U.S. PATENT DOCUMENTS

| | | | |
|---|---|---|---|
| 6,490,567 B1 | 12/2002 | Gregory | |
| 6,539,381 B1 * | 3/2003 | Prasad et al. | 707/999.01 |
| 7,992,091 B2 * | 8/2011 | Bolger et al. | 707/E17.012 |
| 2005/0102364 A1 * | 5/2005 | Ozzie et al. | 709/207 |
| 2006/0080288 A1 | 4/2006 | MacLaurin et al. | |
| 2008/0256292 A1 * | 10/2008 | Flynn et al. | 711/114 |
| 2009/0177658 A1 * | 7/2009 | Brantner et al. | 707/8 |

FOREIGN PATENT DOCUMENTS

| | | |
|---|---|---|
| JP | 06-187213 A | 7/1994 |
| JP | 10-207945 A | 8/1998 |
| JP | 2006-114033 A | 4/2006 |

OTHER PUBLICATIONS

Giuseppe, Decandia et al., "Dynamo: Amazon's Highly Available Key-Value Store", Proceedings of the 21st ACM Symposium on Operating Systems Principles, Oct 14, 2007, pp. 205-220.

* cited by examiner

*Primary Examiner* — Rehana Perveen
*Assistant Examiner* — Tiffany Thuy Bui
(74) *Attorney, Agent, or Firm* — Fujitsu Patent Center

(57) ABSTRACT

A first node apparatus included in a distributed data store acquires first operation information and a first timestamp corresponding to target data. The first operation information specifies a first operation to be executed on the target data. The first timestamp indicates a first receipt time of the first operation information. The first node apparatus determines whether the first receipt time is earlier than some of second receipt times on the basis of second timestamps and the acquired first timestamp. The second timestamp indicates the second receipt time of second operation information. The second operation information specifies a second operation executed on the target data. The first node apparatus re-executes the second operations together with the first operation on the target data in the order of the receipt time when it is determined that the first receipt time is earlier than some of the second receipt times.

6 Claims, 9 Drawing Sheets

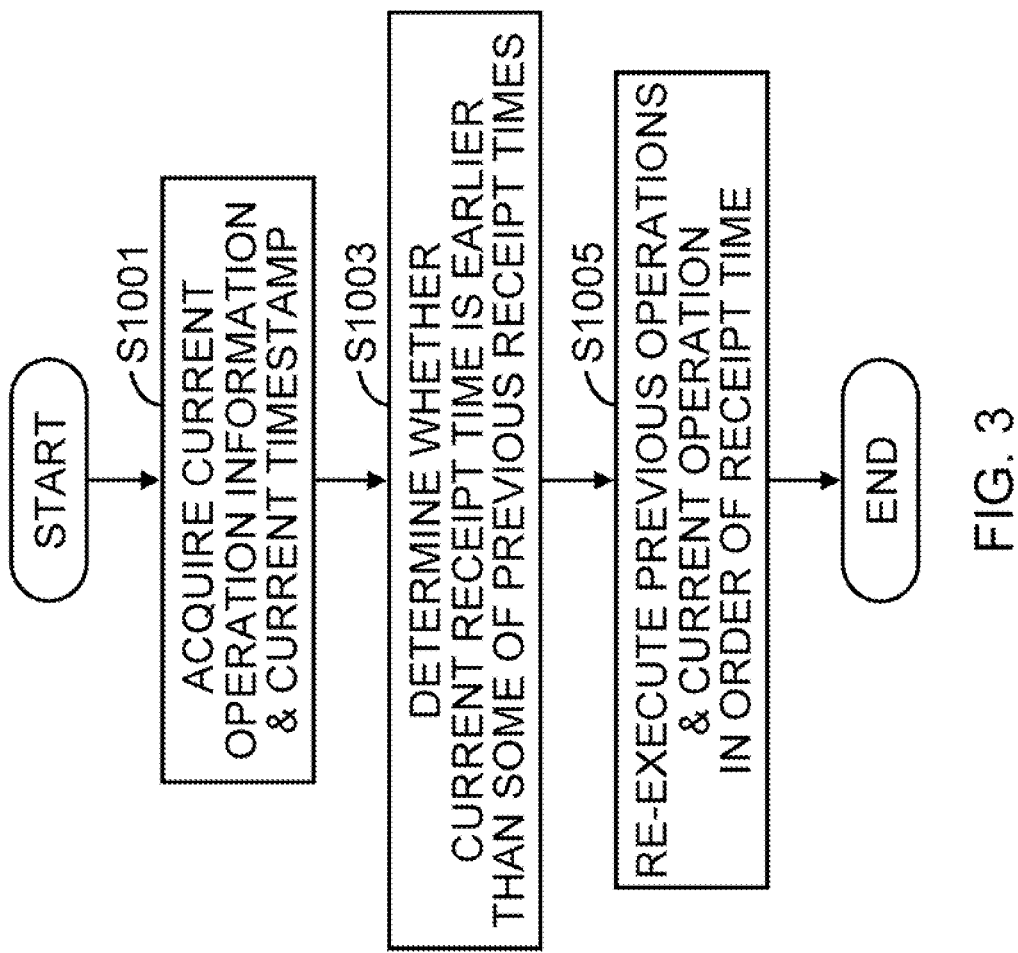
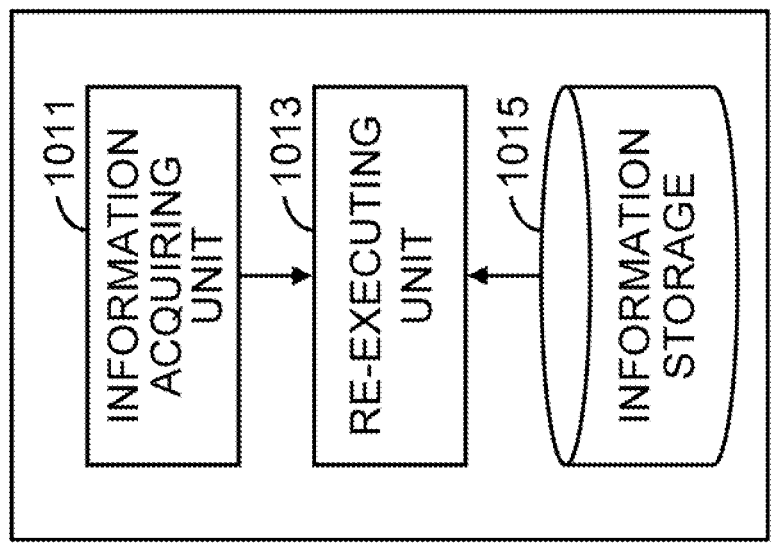

| DATA_A | DATA_B | DATA_C |
|---|---|---|
| Add(2), t=3 | Add(5), t=2 | Add(1), t=4 |
| Mul(3), t=2 | | Set(10), t=3 |
| | | Add(3), t=2 |
| Set(1), t=0 | Set(1), t=0 | Set(1), t=0 |

| DATA NAME | APPLICATION NAME |
|---|---|
| DATA_A | app-001, app-002, app-003 |
| DATA_B | app-004 |
| DATA_C | app-005, app-006 |
| ... | ... |

INFORMATION PROCESSING METHOD AND INFORMATION PROCESSING APPARATUS

CROSS-REFERENCE TO RELATED APPLICATION

This application is based upon and claims the benefit of priority of the prior Japanese Patent Application No. 2010-123138, filed on May 28, 2010, the entire contents of which are incorporated herein by reference.

FIELD

The embodiments discussed herein are related to a distributed data store.

BACKGROUND

A system configured to improve the availability or the like by holding data in a distributed state in a plurality of nodes which are connected with one another over a network has been proposed and may be called a distributed data store.

FIG. 1 illustrates an exemplary system configuration of a distributed data store. An exemplary process which is performed when the distributed data store has received a distributed transaction will be discussed with reference to FIG. 1. For example, a distributed framework 12 in a node NODE_B receives a request for execution of a distributed transaction including operation information specifying an operation. In the example illustrated in FIG. 1, it is supposed that the distributed framework 12 has received operation information specifying an operation "Get(DATA_A1)" (that is, an operation of acquiring a value of data DATA_A1). Then, the distributed framework 12 in the NODE_B locates, by using a distributed hash table (DHT) or the like, a node that holds data to be operated in the operation. Although, in the case that plural pieces of operation information corresponding to a plurality of operations are included in the request for execution of the distributed transaction, a plurality of nodes may be located in some cases, in the example illustrated in FIG. 1, it is supposed that only a node NODE_A has been located. In the above mentioned situation, the distributed framework 12 in the NODE_B forwards the operation information to a distributed framework 11 in the NODE_A. The distributed framework 11 in the NODE_A that has received the operation information from the NODE_B executes the operation (that is, the distributed framework 11 acquires the value of the DATA_A1). In addition, the distributed framework 11 in the NODE_A sends the acquired value of the DATA_A1 to the NODE_B. The distributed framework 12 in the NODE_B that has received the value of the DATA_A1 from the NODE_A sends the received value of the DATA_A1 to a client terminal.

In a distributed data store as mentioned above, each of the plurality of nodes may possibly receive a request for execution of a distributed transaction. Each node does not perform serialization of the transactions upon receipt of the request for execution thereof but does later in accordance with timestamps or the like.

In a distributed data store as mentioned above, the node (hereinafter, referred to as a receptor) that has received the request for execution of the distributed transaction may not always happen to be the node (hereinafter referred to as a container) that holds the data to be operated in the operation. Therefore, it may sometimes occur that operations are executed in the order different from the order in which the operations are originally to be executed, in the case that a timing at which operation information specifying a specific operation reaches the container is delayed owing to, for example, a delay in communication between nodes. In a distributed data store of the type that a plurality of nodes hold replicas of data, when a delay has occurred in timing at which each of the replicas is synchronized with the data, it may sometimes occur that an operation which is to be executed originally after the synchronization is executed before the synchronization.

When operations are executed in the order different from the original correct order of execution, the following problems may occur. For example, it is supposed that a first operation is to set "2" to certain specific data, a second operation is to add "3" to the specific data, and a third operation is to multiply "4" to the specific data. In the above mentioned case, when the operations are executed in the original order, "20" will be obtained as an ultimate execution result of the operations. However, if the first and second operations are executed in reverse order, "11" will be obtained as an ultimate execution result of the operations. That is, when such operations that an ultimate execution result thereof depends on the order of execution are executed on data stored in the distributed data store, a correct execution result of the operations may not be obtained in some cases. Accordingly, such a problem may arise that it is difficult to apply operations to data stored in the distributed data store unless the operations are of the type that the ultimate execution result thereof does not depend on the order of execution of the operations (for example, operations of setting an immediate value and operations of acquiring a value of data).

It is said that a theorem called the CAP theorem is true in a system which performs a process by using a plurality of nodes in a distributed state, for example, a distributed data store as mentioned above. The CAP theorem states that it is impossible for a distributed system to simultaneously provide consistency of data, availability of a system, and tolerance to network partitions. In a distributed data store as mentioned above, availability of a system and tolerance to network partitions are features to be preferentially provided and hence it may sometimes occur that a system is constructed in a state in which strictness to consistency of data is loosened. As a result, such a situation may sometimes occur that data before update is temporarily presented to a user. In many cases, there will be no problem, for example, in written contents of a large-scale bulletin board, goods explanation pages of a shopping site and the like even when such a situation as mentioned above has temporarily occurred. A way of thinking that "although consistency of data is not established at a certain point of time, all is well as long as consistency of data is finally established" may be sometimes called an eventual consistency.

As a technique relating to a distributed data store, a technique as follows is proposed. Specifically, replicas of data are held in a plurality of nodes and a change in the data is reflected on the replicas in background, thereby ensuring the availability of the system. When a conflict is found in the data, a process for resolving the conflict is performed on the side of an application process upon data reading.

The thesis titled "Dynamo: Amazon's Highly Available Key value Store" by G. DeCandia et al. discloses a related technique.

SUMMARY

According to an aspect of the present invention, provided is an information processing method executed by a first node apparatus included in a distributed data store including a plurality of node apparatuses. Each node apparatus included in the distributed data store stores a part of data stored in the distributed data store. According to the information processing method, the first node apparatus acquires first operation information and a first timestamp corresponding to target data. The first operation information specifies a first operation to be executed on the target data. The first timestamp indicates a first receipt time of the first operation information. The first node apparatus determines whether the first receipt time is earlier than some of second receipt times on the basis of second timestamps and the acquired first timestamp. The second timestamp indicates the second receipt time of second operation information. The second operation information specifies a second operation executed on the target data. The second operation information and the second timestamps are stored in an information storage in correspondence with the target data. The first node apparatus re-executes the second operations together with the first operation on the target data in the order of the receipt time in accordance with the second operation information and the acquired first operation information when it is determined that the first receipt time is earlier than some of the second receipt times.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 2 is a diagram illustrating an exemplary functional configuration of an information processing apparatus according to an embodiment of the present invention;

FIG. 3 is a diagram illustrating an exemplary processing flow of an information processing apparatus according to an embodiment of the present invention;

DESCRIPTION OF EMBODIMENTS

Figure 1:
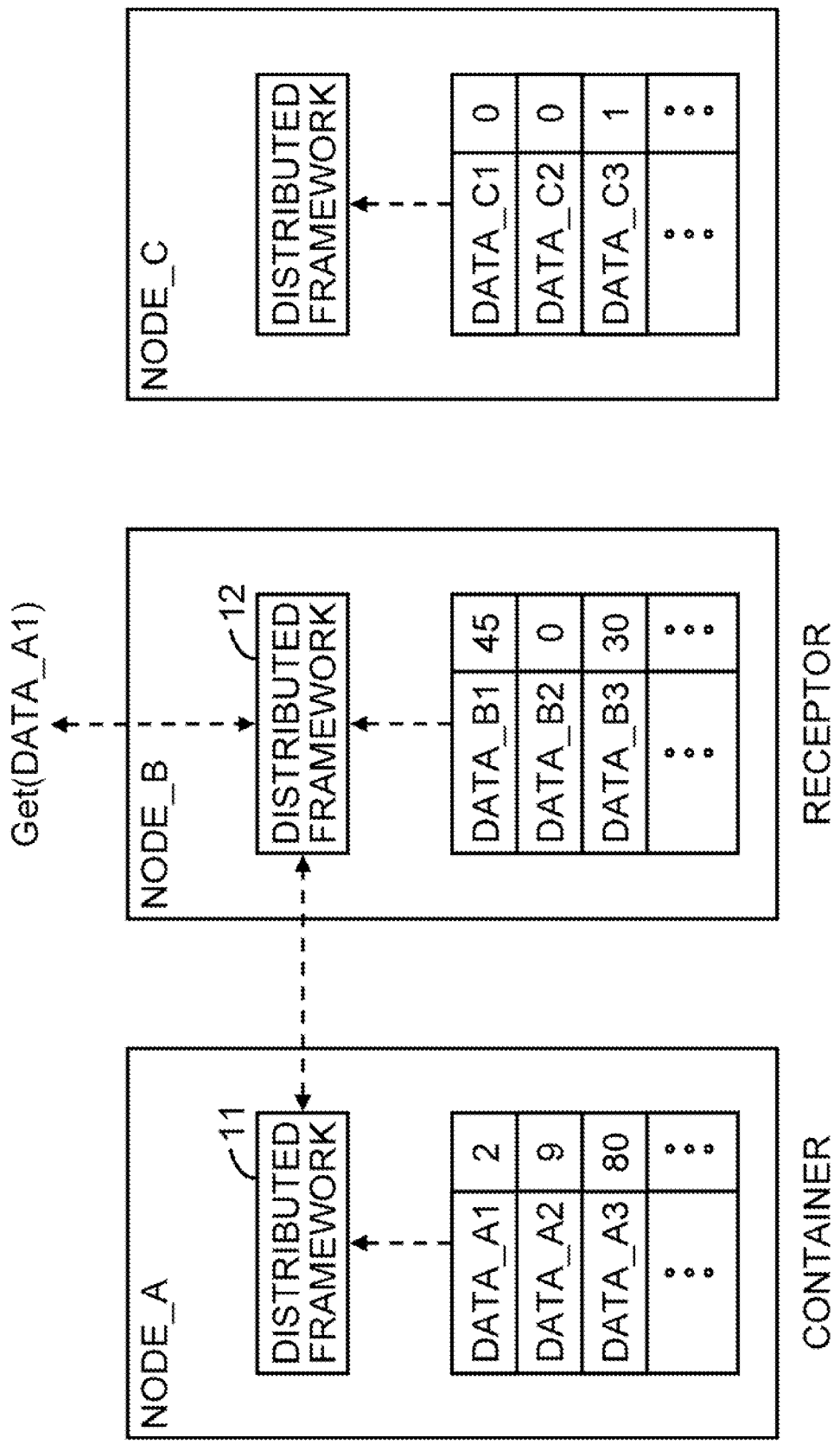
FIG. 1 is a diagram illustrating an exemplary system configuration of a distributed data store.

A technique is not yet proposed that resolves, on the side of the distributed data store, an error in the order of operations so as to make such operations executable that the ultimate execution result thereof depends on the order of execution.

It is preferable to provide a technique for appropriately executing in a distributed data store such operations that the ultimate execution result thereof depends on the order of the operations.

The embodiments provide a technique for appropriately executing in the distributed data store such operations that the ultimate execution result thereof depends on the order of the operations.

[First Embodiment]

FIG. 2 illustrates an exemplary functional configuration of an information processing apparatus according to a first embodiment. The information processing apparatus includes an information acquiring unit 1011, a re-executing unit 1013, and an information storage 1015. The information acquiring unit 1011 acquires operation information specifying an operation and a timestamp indicating a receipt time of the operation information. The re-executing unit 1013 executes operations in accordance with information stored in the information storage 1015. The information storage 1015 stores in correspondence with specific data the operation information specifying the operation already executed on the specific data and the timestamp indicating the receipt time of the operation information. A plurality of information processing apparatuses as illustrated in FIG. 2 are included in an information processing system.

FIG. 3 illustrates an exemplary processing flow of the information processing apparatus according to the present embodiment. The processing flow of the information processing apparatus illustrated in FIG. 2 will be discussed with reference to FIG. 3.

In S1001, the information acquiring unit 1011 acquires current operation information specifying a current operation to be executed on specific data and a current timestamp indicating a current receipt time of the current operation information. The information acquiring unit 1011 outputs a result of the process to the re-executing unit 1013.

In S1003, the re-executing unit 1013 determines whether the current receipt time is earlier than some of previous receipt times, which are stored in the information storage 1015 in correspondence with the specific data, of previous operation information specifying previous operations already executed on the specific data.

In S1005, when it has been determined that the current receipt time is earlier than some of the previous receipt times, the re-executing unit 1013 re-executes the previous operations together with the current operation in the order of the receipt time.

It may become possible to obtain a correct ultimate execution result of the current and previous operations regardless of dependency of the ultimate execution result of the current and previous operations on the execution order thereof by performing processes as discussed above.

[Second Embodiment]

Figure 4:
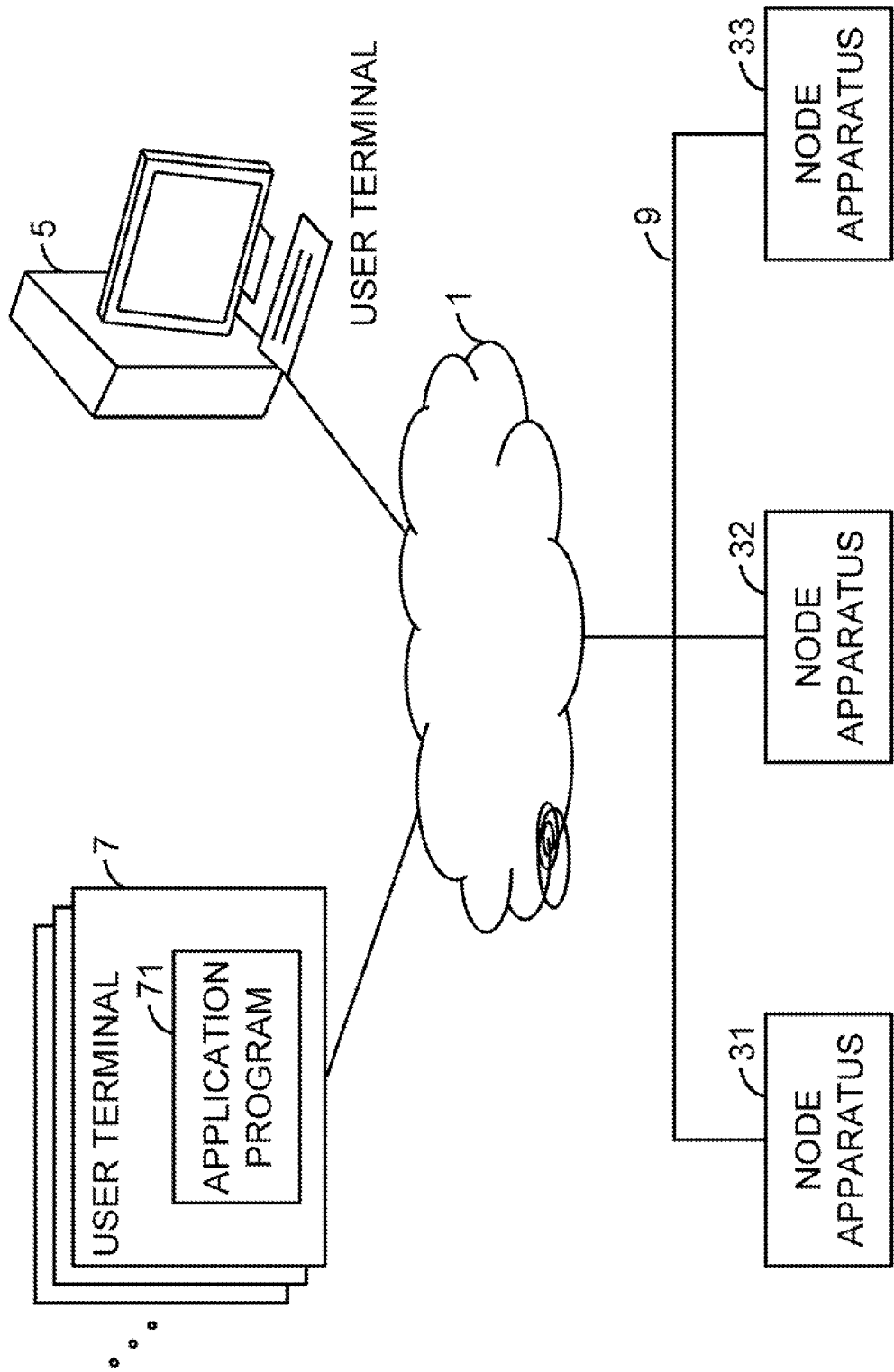
FIG. 4 is a diagram illustrating an exemplary configuration of a system according to an embodiment of the present invention.

A second embodiment will be discussed. FIG. 4 illustrates an exemplary configuration of a system according to the second embodiment. Node apparatuses 31 to 33, a user terminal 5, and a user terminal 7 including an application program 71 are connected with a network 1 such as, for example, the Internet. The node apparatuses 31 to 33 are connected with one another over a network 9. The node apparatuses 31 to 33 are included in a distributed data store. Although FIG. 4 illustrates an example in which three node apparatuses and four user terminals are included, any numbers of node apparatuses and user terminals may be included.

Figures 5, 6, 7:
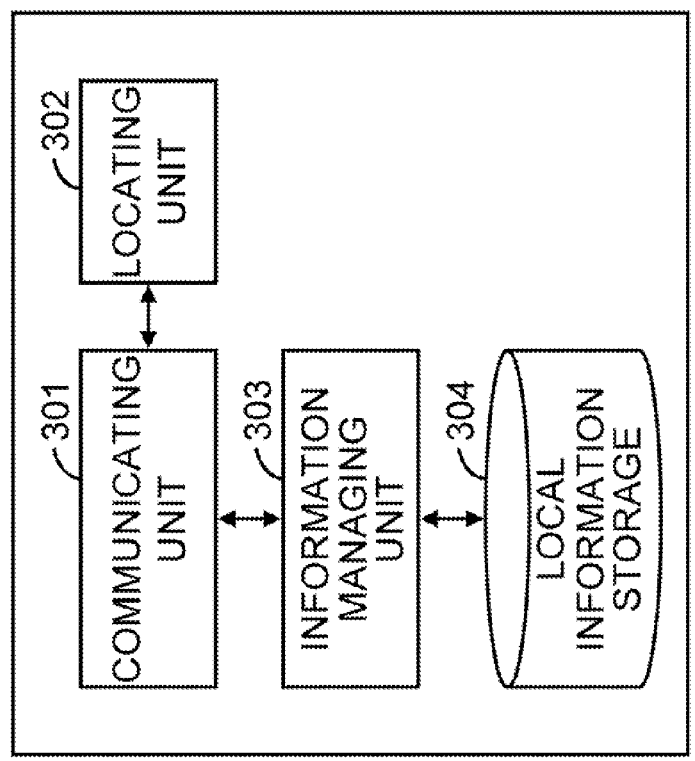
FIG. 5 is a diagram illustrating an exemplary functional configuration of a node apparatus according to an embodiment of the present invention.
FIG. 6 is a diagram illustrating an example of operation history information stored in a local information storage according to an embodiment of the present invention.
FIG. 7 is a diagram illustrating an example of application lists stored in a local information storage according to an embodiment of the present invention.

FIG. 5 illustrates an exemplary functional configuration of a node apparatus according to the present embodiment. A node apparatus includes a communicating unit 301, a locating unit 302, an information managing unit 303, and a local information storage 304.

The communicating unit 301 receives a request for execution of a distributed transaction from the user terminal 5 and forwards operation information specifying an operation to a node apparatus that holds data to be operated in the operation included in the above request. When the data to be operated in the operation included in the above request is held in its own node apparatus, the communicating unit 301 outputs the operation information to the information managing unit 303. The locating unit 302 locates a node that holds the data to be operated in the operation, for example, by a method called consistent hashing or the like. The information managing unit 303 executes the operation in accordance with the operation information received from the communicating unit 301. In addition, the information managing unit 303 manages information stored in the local information storage 304.

FIG. 6 illustrates an example of operation history information stored in the local information storage 304. As illustrated in FIG. 6, the operation history information includes, in correspondence with each data ("DATA_A", for example), operation information ("Add(2)", for example) specifying operations that have been already executed on the data concerned. Each of the operation information is accompanied by a timestamp ("t=3", for example) indicating the receipt time of the operation information. The example illustrated in FIG. 6 indicates that operations already executed on, for example, data DATA_A are an operation of "Set(1)" received at "t=0", an operation of "Mul(3)" received at "t=2", and an operation of "Add(2)" received at "t=3".

The "such operations that an ultimate execution result thereof depends on the order of execution" in the present embodiment includes an operation using a value before update. For example, supposing that "x" is a value before update and "y" is a value after the update, operations "y=11 (substitution of an immediate value)", "y=x.Inc( )=x+1 (increment)", "y=x.Add(2)=x+2 (addition)", "y=$x^2$+2x+3", "y=sin(x)" and the like correspond to the above operations. In addition, decrement, subtraction, multiplication, division and the like correspond to the above operations.

FIG. 7 illustrates an example of application lists stored in the local information storage 304. As illustrated in FIG. 7, an application list including names of application programs related to specific data is stored in the local information storage 304 in correspondence with the name of the specific data.

Figure 8:
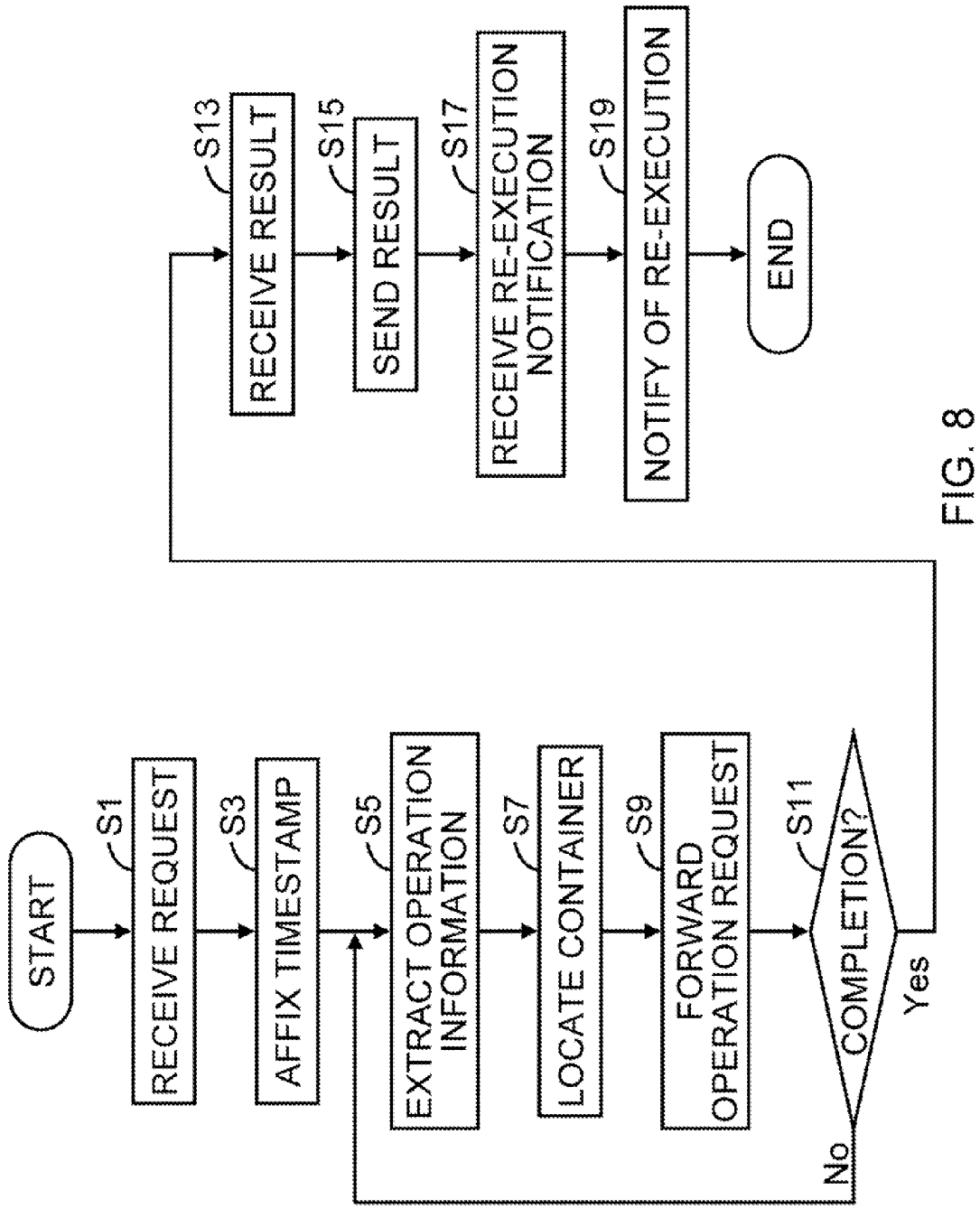
FIG. 8 is a diagram illustrating an exemplary processing flow of a node apparatus that functions as a receptor according to an embodiment of the present invention.

Next, processes performed by the system illustrated in FIG. 4 will be discussed with reference to FIG. 8 to FIG. 11. FIG. 8 illustrates an exemplary processing flow of a node apparatus that functions as the receptor. Processes performed by the node apparatus that functions as the receptor will be discussed with reference to FIG. 8. In the following, a case in which the node apparatus 32 functions as the receptor will be discussed by way of example.

In S1, the communicating unit 301 of the node apparatus 32 receives from the user terminal 5 a request for execution of a distributed transaction. The request includes operation information specifying operations to be executed. The communicating unit 301 stores the received request in a storage such as, for example, a main memory or the like.

In S3, the communicating unit 301 of the node apparatus 32 affixes a timestamp to the request received in S1. For example, the node apparatuses 31 to 33 exchange values of logical clocks in advance using the Lamport's algorithm or the like and the communicating unit 301 affixes the value of the logical clock as the timestamp to the received request.

In S5, the communicating unit 301 of the node apparatus 32 extracts untreated operation information included in the received request. The communicating unit 301 then outputs the extracted operation information to the locating unit 302 of the node apparatus 32.

In S7, the locating unit 302 of the node apparatus 32 locates a node apparatus (a container) that holds data to be operated in the operation by performing, for example, consistent hashing or the like on information which is used to determine the data and is included in the operation information received from the communicating unit 301. In the example illustrated in FIG. 8, it is supposed that the node apparatus 31 has been found to be the container. The locating unit 302 of the node apparatus 32 sends a notification notifying that the node apparatus 31 has been found to be the container to the communicating unit 301 of the node apparatus 32.

In S9, the communicating unit 301 of the node apparatus 32 that has received the notification from the locating unit 302 forwards an operation request (a request for execution of an operation) including the operation information extracted in S5 and the timestamp affixed in S3 to the node apparatus 31 that functions as the container. When the node apparatus 32 itself has been found to be the container in S7, the communicating unit 301 sends the operation request including the operation information extracted in S5 and the timestamp affixed in S3 to the information managing unit 303 of the node apparatus 32.

In S11, the communicating unit 301 of the node apparatus 32 determines whether all the operation information has been treated. When some of the operation information is not yet treated ("No" in S11), the node apparatus 32 returns the process to S5 in order to treat the next operation information. When all the operation information has been treated ("Yes" in S11), the node apparatus 32 advances the process to S13.

In S13, the communicating unit 301 of the node apparatus 32 receives information of the execution result of the operation from the container. The communicating unit 301 of the node apparatus 32 may sometimes acquire the information of the execution result of the operation from the information managing unit 303 of the node apparatus 32.

In S15, the communicating unit 301 of the node apparatus 32 generates information of an execution result of the transaction by aggregating the information of the execution results of the operations received in S13 to send the generated information to the user terminal 5. A method of aggregating the information of the execution results of the operations is different for different transaction types.

In S17, the communicating unit 301 of the node apparatus 32 receives a re-execution notification (a notification notifying that re-execution of the operations concerned has occurred) from the container. The re-execution notification includes the data name of the data on which the operations concerned have been re-executed, a value of the data after the re-execution, and the application list.

In S19, the communicating unit 301 of the node apparatus 32 notifies the user terminal 7 that is executing the application program 71 specified in the application list, of the data name of the data on which the operations concerned have been re-executed and the value of the data after the re-execution. The process in S19 may be performed, for example, by sending a message using a designated internet protocol (IP) address and port number, calling a designated web application programming interface (API), or calling back a designated function via a library for data service. As an alternative, the communicating unit 301 may notify the user terminal 7 of only the data name concerned. When the re-execution is not performed in the container, the processes in S17 and S19 are not performed. Thereafter, the node apparatus 32 terminates the process.

It may become possible to treat a request for execution of a distributed transaction by performing processes as discussed above. In addition, it may become possible for a person, who wants to know whether re-execution has been performed, to receive a notification of re-execution by executing an application program loaded on a terminal or the like that the person operates.

Next, processes performed by a node apparatus that functions as a container will be discussed with reference to FIG. 9 to FIG. 11. In the following, a case in which the node apparatus 31 functions as the container and the node apparatus 32 functions as the receptor will be discussed by way of example.

Figure 9:
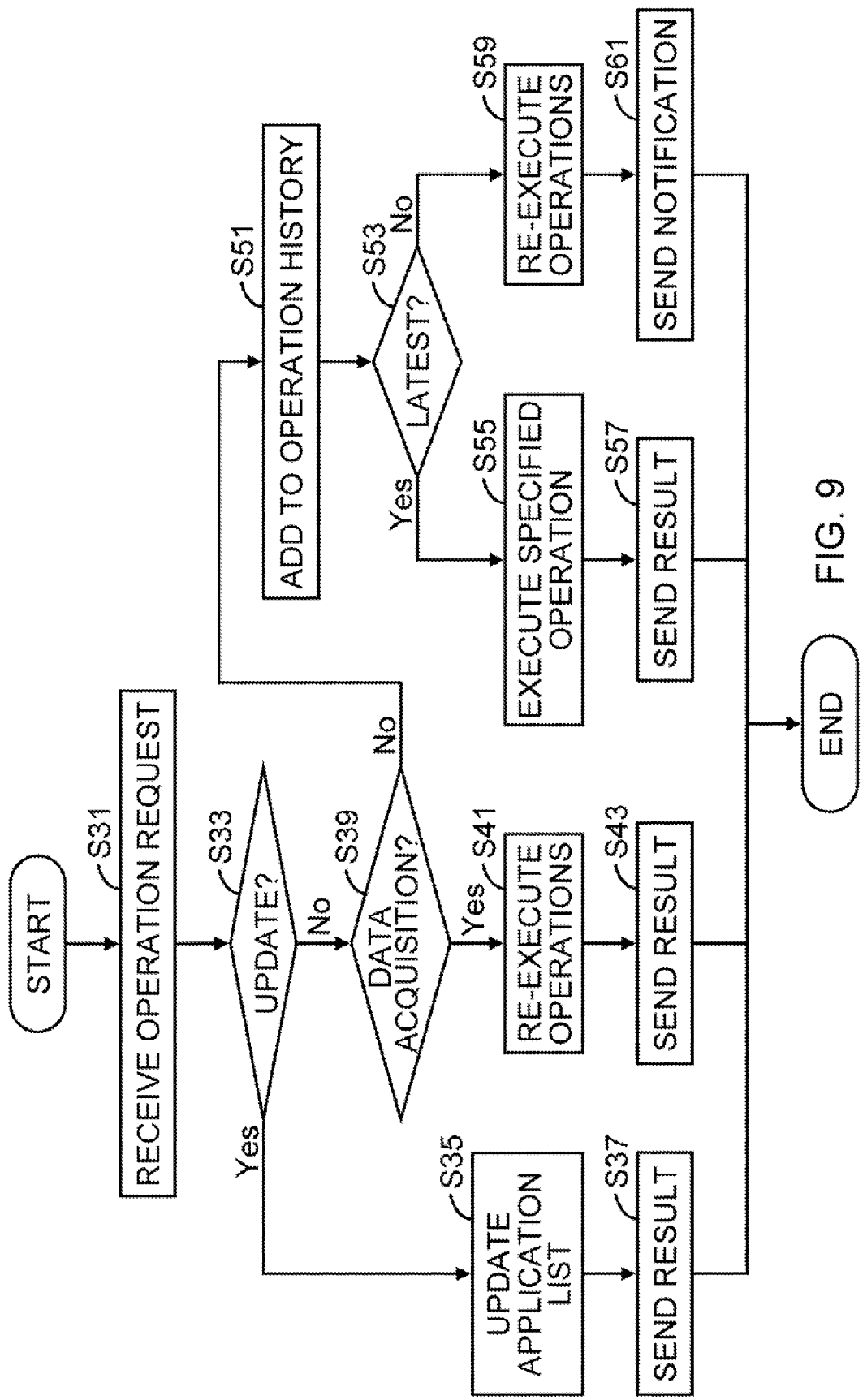
FIG. 9 is a diagram illustrating an exemplary processing flow of a node apparatus that functions as a container according to an embodiment of the present invention.
Figure 10:
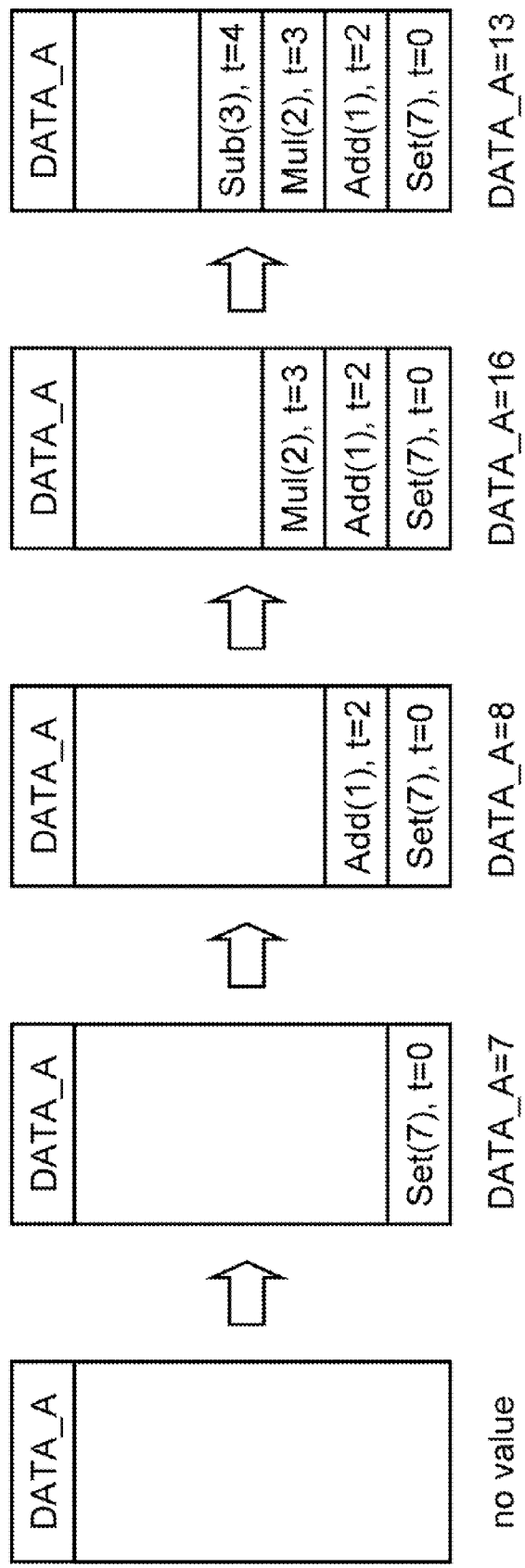
FIG. 10 is a diagram illustrating an exemplary manner of adding information to operation history information according to an embodiment of the present invention.

FIG. 9 illustrates an exemplary processing flow of the node apparatus 31 that functions as the container.

In S31, the communicating unit 301 of the node apparatus 31 receives an operation request that includes operation information and a timestamp affixed thereto from the node apparatus 32 that functions as the receptor. The communicating unit 301 of the node apparatus 31 outputs the request to the information managing unit 303 of the node apparatus 31.

In S33, the information managing unit 303 of the node apparatus 31 determines whether the operation information received in S31 specifies an operation for updating the application list stored in the local information storage 304.

In S35, when it has been determined that the operation information specifies an operation for updating the application list ("Yes" in S33), the information managing unit 303 of the node apparatus 31 updates the application list stored in the local information storage 304. For example, the information managing unit 303 changes, deletes, or adds information included in the application list. The information managing unit 303 generates information for notifying of a result of the update and outputs the generated information to the communicating unit 301 of the node apparatus 31.

In S37, the communicating unit 301 of the node apparatus 31 sends the information for notifying the node apparatus 32 that functions as the receptor of the result of the update. Thereafter, the node apparatus 31 terminates the process.

In S39, when it has been determined that the operation information does not specify an operation for updating the application list ("No" in S33), the information managing unit 303 of the node apparatus 31 determines whether the operation information specifies an operation (for example, an operation "Get") for acquiring a value of data stored in the local information storage 304, that is, the operation request is a request for data acquisition. When it has been determined that the operation information does not specify an operation for acquiring a value of data stored in the local information storage 304 ("No" in S39), the node apparatus 31 advances the process to S51.

In S41, when it has been determined that the operation information specifies an operation for acquiring a value of data stored in the local information storage 304 ("Yes" in S39), the information managing unit 303 of the node apparatus 31 re-executes the operations requested before the receipt time of the request for data acquisition in the order of the receipt time on the basis of the timestamp received in S31 and the timestamps stored in the local information storage 304 in correspondence with the data concerned to acquire a value of the data in accordance with operation information stored in the local information storage 304 in correspondence with the data concerned to acquire a value of the data.

In S43, the information managing unit 303 of the node apparatus 31 sends the value of the data acquired in S41 to the node apparatus 32 that functions as the receptor. Thereafter, the node apparatus 31 terminates the process.

In S51, the information managing unit 303 of the node apparatus 31 adds the operation information and the timestamp received in S31 to the operation history information stored in the local information storage 304.

A method of adding information to the operation history information will be discussed with reference to FIG. 10 and FIG. 11. FIG. 10 illustrates an exemplary manner of adding information to the operation history information of operations executed on the DATA_A.

In the first state, the operation history information of the DATA_A is empty and the DATA_A has no value.

In the second state, information "Set(7), t=0" is stored in the operation history information and a value "7" is set for the DATA_A.

In the third state, information "Add(1), t=2" is added to the operation history information and the value of the DATA_A is changed to "8".

In the fourth state, information "Mul(2), t=3" is added to the operation history information and the value of the DATA_A is changed to "16".

In the final state, information "Sub(3), t=4" is added to the operation history information and the value of the DATA_A is changed to "13".

In the example illustrated in FIG. 10, since each of the timestamps affixed to newly added operations in the third to final states indicates a receipt time later than any one of the receipt times indicated by the timestamps which have been already stored, the operations are executed as they are in arriving order of the operation information. Incidentally, in the example illustrated in FIG. 10, it is supposed for the timestamp that a larger value of "t" indicates a later affixed timestamp.

Figure 11:
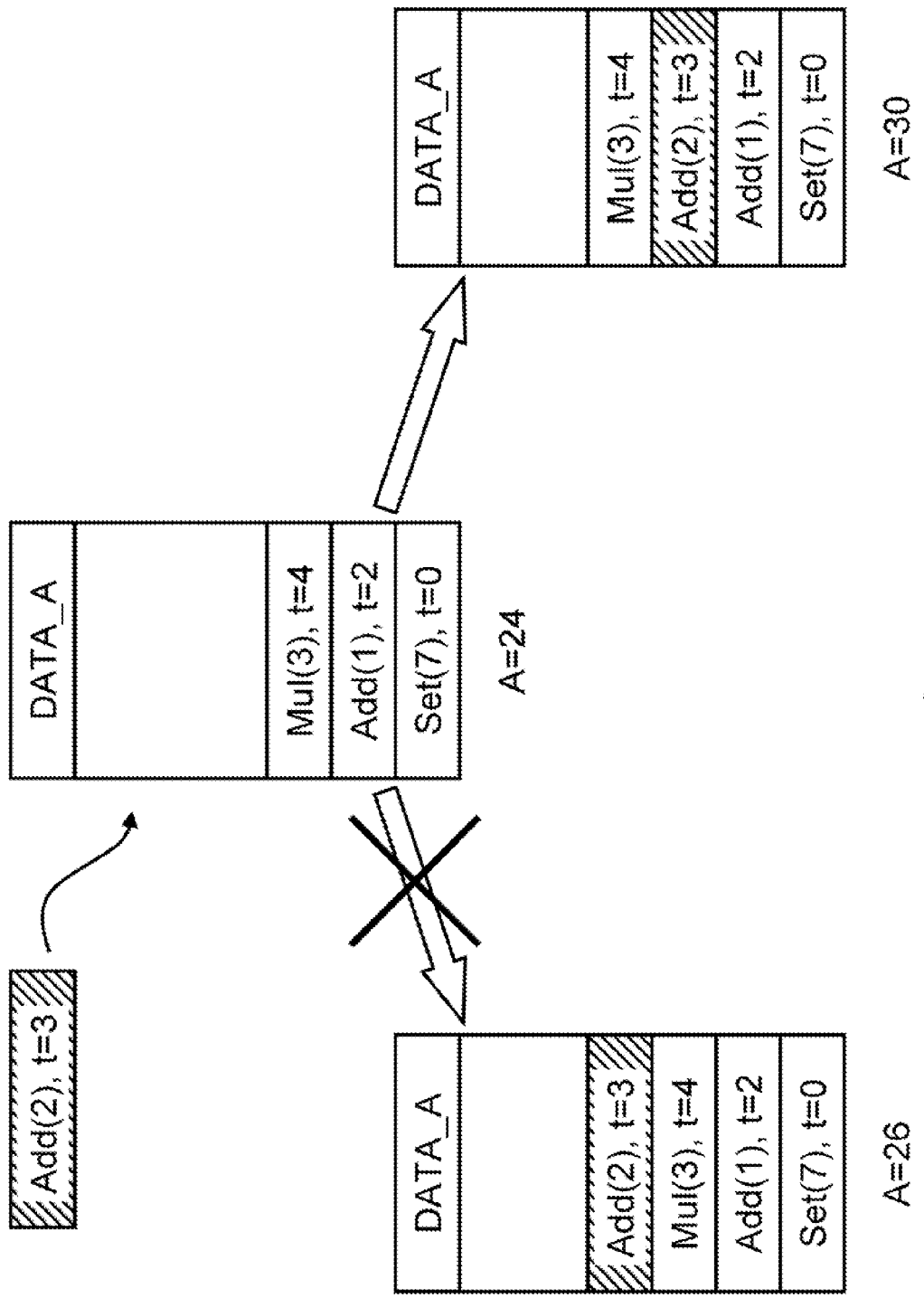
FIG. 11 is a diagram illustrating an example of re-execution of operations according to an embodiment of the present invention.

FIG. 11 illustrates an example of the re-execution of the operations. In the example illustrated in FIG. 11, it is supposed that the container receives operation information accompanied by a timestamp "t=3" after treating operation information accompanied by a timestamp "t=4". In a state that operation information "Mul(3)" accompanied by the timestamp "t=4" has been treated, the value of the DATA_A is "24". Upon receiving operation information "Add(2)" accompanied by the timestamp "t=3" in the above mentioned situation, the value of the DATA_A will be changed to "26" if the operation is executed as it is. However, the original order is such that the operation information accompanied by the timestamp "t=4" is treated after the operation information accompanied by the timestamp "t=3" has been treated.

In the second embodiment, the container takes the following actions when, as in the example illustrated in FIG. 11, the container receives one operation information after another operation information and the one operation information is to be originally treated before the another operation information. That is, the container inserts the one operation information and the timestamp thereof to the operation history information so as to be arranged in the order of the receipt time on the basis of the timestamps. Thereafter, the container re-executes the operations concerned on the DATA_A in accordance with the operation history information. As illustrated in FIG. 11, the container sets a correct value "30" for the DATA_A by re-executing the operations on the DATA_A in the above discussed manner. In the present embodiment, the container does not add operation information specifying an operation for acquiring a value of data to the operation history information. The reason for the above lies in that the operation executed for acquiring the value of the data has no effect on the value of the data.

In S53 of FIG. 9. The information managing unit 303 of the node apparatus 31 determines whether the timestamp received in S31 indicates a receipt time later than any one of receipt times indicated by the timestamps stored in the local information storage 304 in correspondence with the data to be operated in the operation concerned (that is, whether it is the latest timestamp).

In S55, when it has been determined that it is the latest timestamp in S53 ("Yes" in S33), the information managing unit 303 of the node apparatus 31 executes the operation in accordance with the operation information received in S31.

In S57, the information managing unit 303 of the node apparatus 31 sends a result of execution of the operation to the node apparatus 32 that functions as the receptor.

In S59, when it has been determined that it is not the latest timestamp in S53 ("No" in S53), the information managing unit 303 of the node apparatus 31 re-executes the already executed operations together with an operation specified by the operation information received in S31 in the order of the receipt on the basis of the timestamp received in S31 and the timestamps stored in the local information storage 304 in correspondence with the data to be operated in the operation concerned in accordance with operation information stored in the local information storage 304 in correspondence with the data to be operated in the operation concerned and the operation information received in S31

In S61, the information managing unit 303 of the node apparatus 31 generates a re-execution notification and sends the generated notification to the node apparatus 32 that functions as the receptor. The re-execution notification includes the data name of the data on which the operations concerned have been re-executed, a value of the data after the re-execution, and the application list. Thereafter, the node apparatus 31 terminates the process.

By performing processes as discussed above in the distributed data store, it may become possible to appropriately execute both an operation for acquiring a value of data and such operations that an ultimate execution result thereof depends on the order of execution.

Embodiments are not limited to those discussed above. For example, the functional configurations of the information processing apparatus and the node apparatus discussed above may not always correspond to module configurations of actual programs.

The configurations of the operation history information and the application list discussed above is mere examples and it may not be the case that each information is always configured as discussed above. Further, in the processing flows, the order in which the processes are executed may be changed as long as the result of execution of the processes is not changed. Still further, parallel execution of the processes may be possible.

Although in the above mentioned examples, a case in which the plurality of node apparatuses operate has been discussed, it may be possible to make, for example, a single apparatus start up a plurality of processing operations so as to execute processes as mentioned above.

Figure 12:
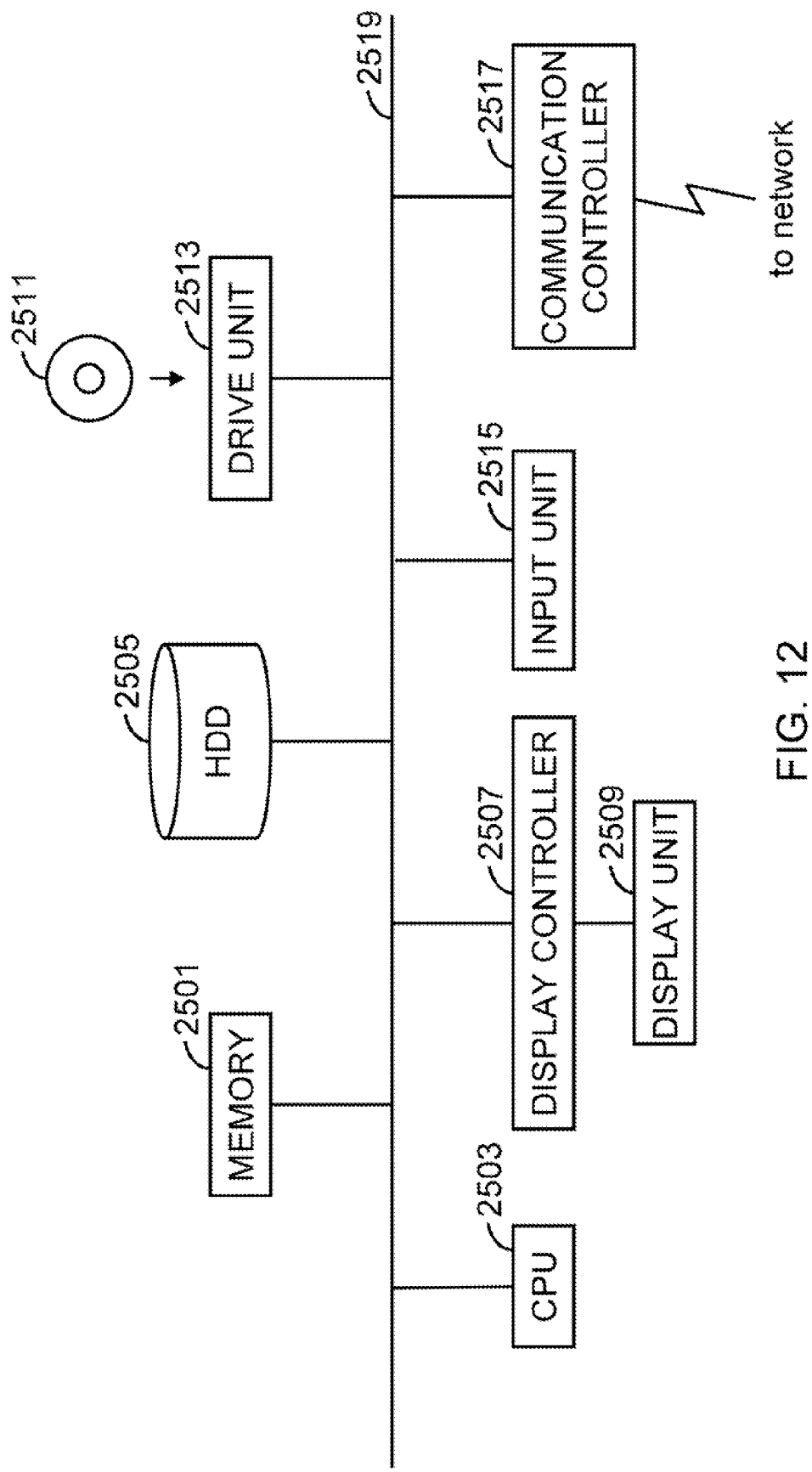
FIG. 12 is a diagram illustrating an exemplary configuration of a computer.

The above discussed node apparatuses 31 to 33 may be implemented by using a computer. FIG. 12 illustrates an exemplary configuration of a computer. For example, as illustrated in FIG. 12, a computer may include a memory 2501, a central processing unit (CPU) 2503, a hard disk drive (HDD) 2505, a display controller 2507 which is connected with a display unit 2509, a drive unit 2513 that drives a removable disk 2511, an input unit 2515 and a communication controller 2517 which is connected with a network and the above mentioned elements are connected with one another via a bus 2519. An Operating System (OS) and an application program for performing processes in the embodiments may be stored in a storage unit such as, for example, the HDD 2505 or the like and when the OS or the application program is executed by the CPU 2503, it may be read out of the HDD 2505 into the memory 2501. The CPU 2503 may control the display controller 2507, the communication controller 2517 and the drive unit 2513 so as to perform desirable operations. Data which is being processed may be stored into the memory 2501 and may be stored in the HDD 2505 as desired. According to an embodiment, the application program for performing the above discussed processes may be stored in the computer readable removable disk 2511 to be distributed and may be installed from the drive unit 2513 into the HDD 2505. In some cases, the application program may be installed into the HDD 2505 over a network such as, for example, the Internet or the like and via the communication controller 2517. In a computer as mentioned above, the hardware elements such as the above mentioned CPU 2503, memory 2501 and the like systematically cooperate with the OS and a desirable application program to implement various functions as discussed above. The information storage 1015 illustrated in FIG. 2 may be implemented as the memory 2501, the HDD 2505 and the like illustrated in FIG. 12. The same thing also applies to the local information storage 304 illustrated in FIG. 5. The information acquiring unit 1011 and the re-executing unit 1013 illustrated in FIG. 2 may be implemented by combining the CPU 2503 with a program, that is, by executing the program concerned by the CPU 2503. More specifically, the CPU 2503 may function as a function unit discussed above by performing processes in accordance with a program which is stored in the HDD 2505 or the memory 2501. The same thing also applies to the communicating unit 301, the locating unit 302 and the information managing unit 303 illustrated in FIG. 5.

The above discussed embodiments are summarized as follows.

An information processing method according to the embodiments is executed by one node apparatus included in an information processing system including a plurality of node apparatuses. The information processing method includes acquiring, determining, and re-executing. In the acquiring, the one node apparatus acquires first operation information (for example, information specifying an arithmetic operation, more specifically, for example, "Add" indicative of addition and a value to be added) and a first time stamp corresponding to specific data. The first operation information specifies a first operation to be executed on the specific data. The first time stamp indicates a first receipt time of the first operation information. In the determining, the one node apparatus determines whether the first receipt time is earlier than some of second receipt times on the basis of second timestamps and the acquired first timestamp. The second timestamp indicates the second receipt time of second operation information specifying a second operation that has been already executed on the specific data. The second operation information and the second timestamps are stored in an information storage in correspondence with the specific data. In the re-execution, the one node apparatus re-executes the second operations together with the first operation on the specific data in the order of the receipt time in accordance with the second operation information and the acquired first operation information when it has been determined that the first receipt time is earlier than some of the second receipt times.

By executing the operations in the above mentioned manner, it may become possible to appropriately execute such operations that an ultimate execution result thereof depends on the order of execution.

The information processing method may also include executing the first operation on the specific data in accordance with the acquired first operation information when it has been determined that the first receipt time is later than any one of the second receipt times. The reason for provision of the above mentioned process lies in that a correct execution result may be obtained simply by executing only the first operation when the first operation is an operation to be executed after execution of the second operations.

The information storage may also store an application list in correspondence with the specific data. The application list specifies application programs related to the specific data. In the above mentioned situation, the information processing method may further include a generating. In the generating, the one node apparatus generates, when the re-execution has been executed, information for notifying a second node apparatus of an execution result of the re-execution. The second node apparatus is included in the information processing system. The second node apparatus is executing an application program which is specified, in correspondence with the specific data, in the application list stored in the information storage. Owing to provision of the above mentioned process, it may become possible for a person, who wants to know whether re-execution has been performed on the specific data, to receive a notification of re-execution by executing an application program loaded on a terminal or the like that the person operates.

The acquiring may include receiving the first operation information from a client terminal and acquiring the receipt time of the first operation information. Owing to provision of the above mentioned processes, it may become possible to cope with even such a situation that the one node apparatus receives operation information directly from the client terminal.

The acquiring may include receiving the first operation information and the first timestamp from another node apparatus of the plurality of node apparatuses. Owing to provision of the above mentioned process, it may become possible to cope with even such a situation that a node that functions as a receptor is different from a node that functions as a container.

A program causing a computer to perform the above mentioned method may be prepared. The prepared program may be stored in a computer readable medium or storage device such as, for example, a flexible disk, a compact disc read only memory (CD-ROM), a magneto-optical disk, a semiconductor memory, a hard disk or the like. An interim execution result of a process is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. An information processing method executed by a first node apparatus included in a distributed data store including a plurality of node apparatuses, each node apparatus included in the distributed data store storing a part of data stored in the distributed data store, the information processing method comprising:

acquiring, by the first node apparatus from a second node apparatus connected to the first node apparatus over a network, first operation information and a first timestamp corresponding to target data, the first operation information specifying a first operation to be executed on the target data, the first timestamp indicating a first receipt time of the first operation information;

determining whether the first receipt time is earlier than some of second receipt times on the basis of second timestamps and the acquired first timestamp, the second timestamp indicating the second receipt time of second operation information, the second operation information specifying a second operation executed on the target data, the second operation information and the second timestamps being stored in an information storage in correspondence with the target data; and re-executing the second operations together with the first operation on the target data in the order of the receipt time in accordance with the second operation information and the acquired first operation information when it is determined that the first receipt time is earlier than some of the second receipt times;

wherein the information storage further stores an application list in correspondence with the target data, the application list specifying application programs related to the target data, the information processing method further comprising:

generating, upon the re-execution, information for notifying the second node apparatus of an execution result of the re-execution, the second node apparatus being included in the distributed data store, the second node apparatus executing the application program specified by the application list stored in the information storage in correspondence with the target data.

2. The information processing method according to claim 1, further comprising:

executing the first operation on the target data in accordance with the acquired first operation information when it is determined that the first receipt time is later than any of the second receipt times.

3. The information processing method according to claim 1, wherein the first node apparatus receives the first operation information from a client terminal.

4. The information processing method according to claim 1, wherein the first node apparatus receives the first operation information and the first timestamp from the second node apparatus included in the distributed data store.

5. An information processing apparatus comprising:

an information storage configured to store first operation information and a first timestamp in correspondence with target data, the target data received at the information processing apparatus from a second information processing apparatus connected to the information processing apparatus over a network, the first operation information specifying a first operation executed on the target data, the first timestamp indicating a first receipt time of the first operation information;

a processor to acquire second operation information and a second timestamp corresponding to the target data, the second operation information specifying a second operation to be executed on the target data, the second timestamp indicating a second receipt time of the second operation information, to determine whether the second receipt time is earlier than some of the first receipt times on the basis of the first timestamps stored in the information storage and the acquired second timestamp, and to re-execute the first operations together with the second operation on the target data in the order of the receipt time in accordance with the first operation information and the acquired second operation information when it is determined that the second receipt time is earlier than some of the first receipt times;

wherein the information storage further stores an application list in correspondence with the target data, the application list specifying application programs related to the target data, the information processing method further comprising:

generating, upon the re-execution, information for notifying the second node apparatus of an execution result of the re-execution, the second node apparatus being included in the distributed data store, the second node apparatus executing the application program specified by the application list stored in the information storage in correspondence with the target data.

6. A computer-readable, non-transitory medium storing a program that causes a node apparatus to execute an information processing method, the node apparatus being included in a distributed data store including a plurality of node apparatuses, each node apparatus included in the distributed data store storing a part of data stored in the distributed data store, the information processing method comprising:

acquiring, by a first node apparatus from a second node apparatus connected to the first node apparatus over a network, first operation information and a first timestamp corresponding to target data, the first operation information specifying a first operation to be executed on the target data, the first timestamp indicating a first receipt time of the first operation information;

determining whether the first receipt time is earlier than some of second receipt times on the basis of second timestamps and the acquired first timestamp, the second timestamp indicating the second receipt time of second operation information, the second operation information specifying a second operation executed on the target data, the second operation information and the second timestamps being stored in an information storage in correspondence with the target data; and re-executing the second operations together with the first operation on the target data in the order of the receipt time in accordance with the second operation information and the acquired first operation information when it is determined that the first receipt time is earlier than some of the second receipt times;

wherein the information storage further stores an application list in correspondence with the target data, the application list specifying application programs related to the target data, the information processing method further comprising:

generating, upon the re-execution, information for notifying the second node apparatus of an execution result of the re-execution, the second node apparatus being included in the distributed data store, the second node apparatus executing the application program specified by the application list stored in the information storage in correspondence with the target data.

* * * * *